Aug. 4, 1942.  F. S. CARPENTER  2,292,265
CLOCK MOTOR
Filed Oct. 6, 1939
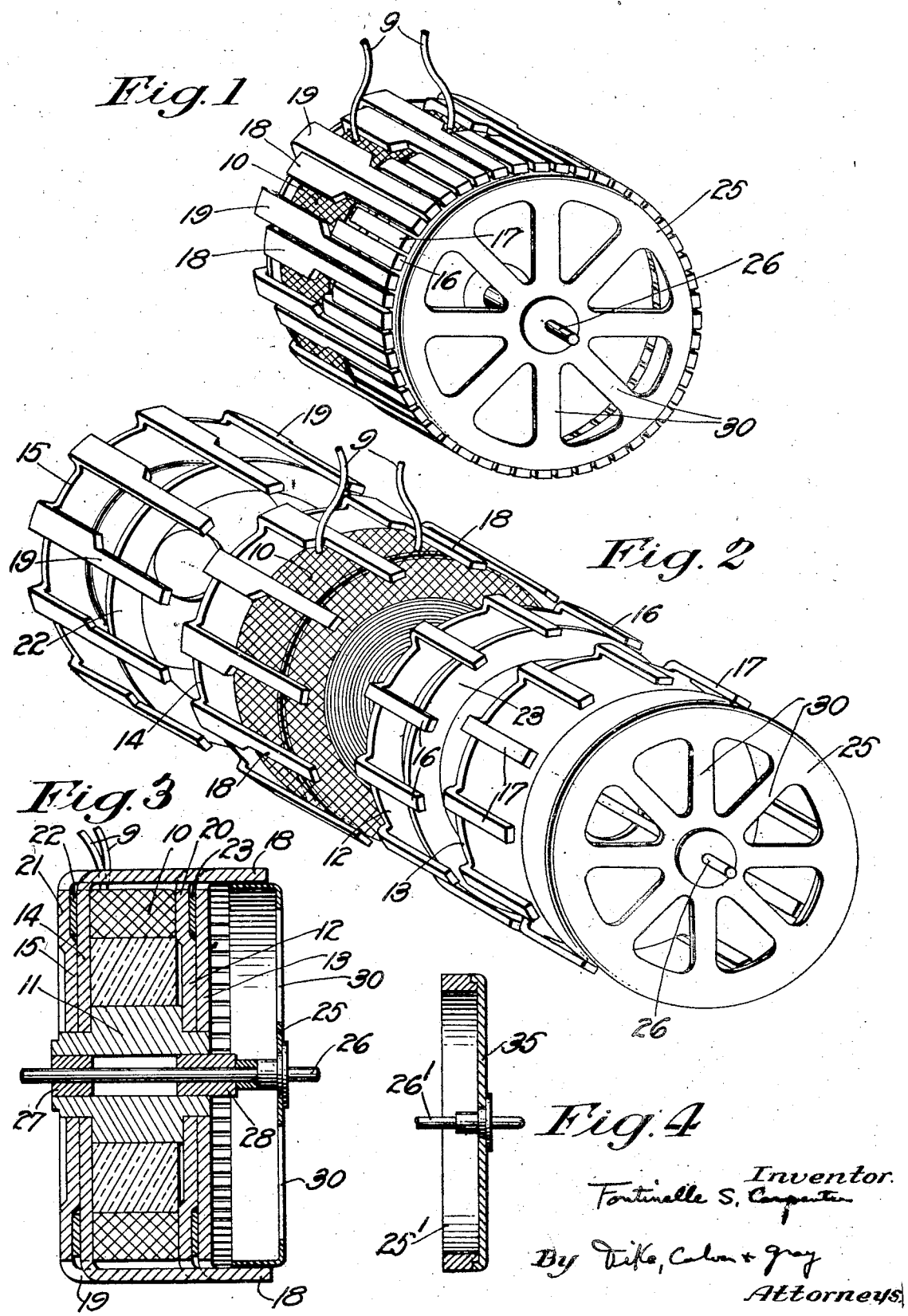
Inventor.
Fontinelle S. Carpenter
By Dike, Calver & Gray
Attorneys Patented Aug. 4, 1942

2,292,265

UNITED STATES PATENT OFFICE 2,292,265

CLOCK MOTOR

Fontinelle Scott Carpenter, Watertown, Mass., assignor to Waltham Watch Company, Waltham, Mass., a corporation of Massachusetts Application October 6, 1939, Serial No. 298,201

8 Claims. (Cl. 172—278)

This invention relates to synchronous motors and has particular relation to small self-starting, single phase, synchronous motors, such as are utilized for timing purposes.

It is an object of the present invention to produce a small synchronous, slow speed motor having a low power consumption and high running torque, and also possessing a high starting torque and low temperature rise during running.

It is a further object of the invention to provide a motor of this general type which can be produced at low cost.

Other objects will appear more fully from the following detailed description, accompanying drawing, and appended claims.

For the purpose of illustrating the invention, there are shown in the accompanying drawing forms thereof which are at present preferred, since the same have been found in practice to give satisfactory and reliable results, although it is to be understood that the various instrumentalities of which the invention consists can be variously arranged and organized and that the invention is not limited to the precise arrangements and organizations of the instrumentalities as herein shown and described.

The invention will be more clearly understood from the following description in conjunction with the accompanying drawing, in which:

Fig. 1 is a perspective view of a motor embodying the invention;

Fig. 2 is a perspective view of the same with the parts slightly separated;

Fig. 3 is a sectional elevational view of the same; and

Fig. 4 is a sectional elevational view of a modified form of one of the parts.

In the embodiment of the invention illustrated, the motor comprises an exciting coil 10 surrounding a core member 11 which projects beyond the opposite faces of the coil. The coil 10 is supplied with an alternating current through the leads 9. A pair of field casing sections 12 and 13 surround one end of the core member and are suitably fixed thereto so as to extend across one face of the coil 10. A pair of casing section members 14 and 15 surround the other end of the core member and are suitably secured thereto so as to extend across the opposite face of the coil 10. Each of the casing section members 12, 13, 14 and 15 preferably, are made from discs of low loss steel, such as a silicon steel having an Erichsen number of about 7 mm., and are provided with circumferentially spaced originally radial projections which are bent at right angles to the general plane of the disc. Thus, the sections 12 and 13 are provided with projections 16 and 17, respectively, extending in the same direction and forming pole pieces, and the casing sections 14 and 15 are provided with projections 18 and 19, respectively, forming pole pieces extending in the same direction as the pole pieces 16 and 17. The pole pieces 16 and 17 are arranged adjacent and between the pole pieces 18 and 19 and all terminate in a common plane. The portions of pole pieces 18 and 19 which enclose the coil 10 have an enlarged cross section. The casing sections 12 and 15, may each be provided with off-set portions 20 and 21, respectively, to provide a space between the same and the sections 13 and 14 for the insertion of copper shading rings 23 and 22, respectively. Each pair of casing sections 12, 13 and 14, 15 are in magnetic contact inside the shading rings 22 and 23.

A rotor 25 is fixed near one end of a shaft 26 which is mounted for rotation in bearings 27 and 28 within the core member 11. The rotor 25 is a cupped disk of steel of high retentivity with its cylindrical portion arranged in spaced relation with the inner faces of the pole pieces 16, 17, 18 and 19, the center of gravity of the rotor being outside the bearings 27 and 28.

The surface of each of the pole pieces 16, 17, 18 and 19 opposite the rotor 25 is flat, this being permitted by the fact that the pole pieces have a width exceeding only slightly the gauge thickness of the metal. The spacing between adjacent pole pieces is comparatively large with respect to the air gap between the rotor and pole pieces. In the motor illustrated, which has a diameter of about 1⅞ inches, each casing section is provided with twelve pole pieces spaced equidistant. Thus, the arcuate distance between the centers of adjacent pole pieces is equal to about eight times the gauge thickness of the metal. Consequently, the number of pairs of poles in the motor may be represented by $$\frac{\pi D}{8C}$$

where D is the diameter of the motor and C is the gauge thickness of the casing sections.

Preferably the disk portion of the rotor is cut away to provide a number of spokes 30 which is less than the number of field poles of the motor. The number of spokes 30 is such that one-half of them shall be opposite the north poles and the other half opposite the south poles. In other words the number of field poles divided by the number of spokes shall be an odd number.

By using silicon steel casing sections, it is possible to greatly reduce the size of the shading rings 22 and 23. Thus, the shading ring dimensions in inches are such that its mean diameter divided by its width times its thickness is approximately 430. For example, the shading rings 22 and 23 of the illustrated embodiment may each have an outside diameter of 1.615" and an inside diameter of 1", giving a mean diameter of approximately 1.307", and a width of approximately .307", and these shading rings may each be .010" thick. This mean diameter of 1.307", divided by the width .307" times the thickness .010", equals approximately 426, which is close to the stated figure 430. The resistance of the shading ring circuit is about 0.001 ohm. In the construction of the invention, it is possible to employ a low loss steel, such as silicon steel, which while not easily susceptible to a drawing operation may be bent to provide the symmetrical polar construction in the motor of the invention with minimum leakage paths.

If desired, the construction of the rotor may be modified as illustrated in Fig. 4 and may comprise cupped rotor 25' having a disc portion 35 of steel or aluminum suitably fixed upon one end of a shaft 26'. The cylindrical wall of the rotor 25' may be an alloy known as Alnico containing as its principal constituents nickel, aluminum, cobalt and iron. Preferably, such an alloy in finely divided form is molded with a plastic material, such as Bakelite.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

I claim:

1. A motor comprising a magnetizing coil, field casing portions of silicon steel at each end of said coil and having pole pieces projecting at right angles therefrom, a rotor of high retentivity having spaced relation with respect to the pole pieces, one of said field casing portions having separate disc portions, and ring-shaped copper shading means positioned between said disc portions, the dimensions of the entire shading means being such that its mean diameter divided by the overall width times the thickness is approximately 430.

2. A stator construction for a self-starting single-phase synchronous electric motor comprising a field coil, a magnetizable core extending axially therethrough, four field casing sections disposed two at one side of said field coil and two at the opposite side thereof, each of said four field casing sections being in intimate magnetic contact with said core, a plurality of projections integral with and extending axially from each of said four field casing sections and constituting pole pieces, the pole pieces of the pair of sections at one side of the field coil being relatively short and extending in a direction away from said field coil, and the pole pieces of the other pair of sections at the opposite side of said coil being relatively long and embracing said coil and extending therebeyond between said relatively short pole pieces, the pole pieces of each pair of sections being adjacent and disposed between the pole pieces of the other pair of sections, and all of said pole pieces forming a generally cylindrical structure at one side of said field coil, and two flat annular imperforate shading elements, made of electrically-conductive non-magnetic material, disposed one between the pair of field casing sections which bear the relatively long pole pieces, and the other between the other pair of field casing sections at the opposite side of said field coil which bear the relatively short pole pieces, said shading elements serving to delay the flux in the field casing section furthest from the field coil at each side of said coil, respectively, thereby to produce a rotatably shifting field.

3. A stator construction for a self-starting single-phase synchronous electric motor comprising a field coil, a magnetizable core extending axially therethrough, four field casing sections, made of silicon steel, mounted on said core, two of said sections being disposed at one side of said field coil and the remaining two being disposed at the opposite side thereof, a plurality of projections integral with and extending axially from each of said four field casing sections and constituting pole pieces, the pole pieces of the pair of sections at one side of the field coil being relatively short and extending away from said field coil, and the pole pieces of the other pair of sections at the opposite side of said coil being relatively long and embracing said coil and extending therebeyond between said relatively short pole pieces, all of said pole pieces forming a generally cylindrical structure at one side of said field coil, and two flat annular copper shading elements disposed one between the pair of field casing sections which bear the relatively long pole pieces, and the other between the other pair of field casing sections at the opposite side of said field coil which bear the relatively short pole pieces, the inner edge of each copper shading element being spaced from the outer surface of the core by a distance at least equal to the width of the shading element, whereby the flux-delaying currents induced in said elements disposed between said field casing sections must flow therethrough along zones radially remote from said core and in proximity to the basal portions of said pole pieces.

4. A self-starting, single-phase, synchronous electric hysteresis motor comprising a field coil, a magnetizable core extending axially therethrough, four field casing sections mounted on said core, two of said sections being disposed at one side of said field coil and two at the opposite side thereof, a plurality of projections integral with and extending axially from each of said four field casing sections and constituting pole pieces, the pole pieces of the pair of sections at one side of the field coil being relatively short and extending in a direction away from said field coil and the pole pieces of the other pair of sections at the opposite side of said coil being relatively long and embracing said coil and extending therebeyond between said relatively short pole pieces, all of said pole pieces forming a generally cylindrical structure at one side of said field coil, two flat annular imperforate shading elements, made of electrically-conductive non-magnetic material, disposed one between the pair of field casing sections which bear the relatively long pole pieces, and the other between the other pair of field casing sections at the opposite side of said field coil which bear the relatively short pole pieces, and a one-piece cup-shaped non-salient pole rotor made of magnetizable material and comprising a continuous generally cylindrical hysteretic rim portion disposed at one side of said field coil and inside the cylindrical structure formed by said pole-pieces and paralleling said structure in relatively close proximity thereto, and a ferrous rim-supporting structure integral with said rim at an edge thereof and lying in a plane relatively remote from the nearest field casing section body, said rotor being mounted on a shaft rotatably journalled within said core.

5. A self-starting single phase hysteresis motor comprising a magnetizing coil, a core within said coil, a pair of field casing sections of silicon steel at each end of said coil, each of said sections comprising a disc having integral projections bent in one direction at right angles to the disc, said projections constituting pole pieces arranged so that the pole pieces of one pair of sections are adjacent and between the pole pieces of the other pair of sections, a rotor of high retentivity having spaced relation with respect to the pole pieces and rotatably supported within said core, a shading ring disposed intermediate each pair of casing sections for delaying the flux passing through the pole pieces of the field casing section furthest from said magnetizing coil, the dimensions of each shading ring being such that its mean diameter divided by its width times its thickness is approximately 430, and the number of pairs of poles being ¼ of the total number of pole pieces present and slightly less than $$\frac{\pi D}{8C}$$

where D is the diameter of the motor and C is the gauge thickness of the discs.

6. A self-starting single phase motor comprising a magnetizing coil, a core within said coil, a pair of field casing sections of silicon steel at each end of said coil, each of said sections comprising a disc having integral projections bent in one direction at right angles to the disc, said projections constituting pole pieces and arranged so that the pole pieces of one pair of sections are adjacent and between the pole pieces of the other pair of sections, a rotor having spaced relation with respect to the pole pieces, and shading means for delaying the flux passing through the pole pieces of one section of each pair of sections, the number of pairs of poles being ¼ of the total number of pole pieces present and slightly less than $$\frac{\pi D}{8C}$$

where D is the diameter of the motor and C is the gauge thickness of the discs.

7. A self-starting single phase hysteresis motor comprising a magnetizing coil, a core within said coil, a pair of field casing sections of silicon steel at each end of said coil, each of said sections comprising a disc having integral projections constituting pieces bent in one direction at right angles to the disc, the pole pieces of all of said sections extending in the same direction and terminating in a common plane to one side of said magnetizing coil, said pole pieces being arranged so that the pole pieces of one pair of sections are adjacent and between the pole pieces of the other pair of sections, a rotor of high retentivity having spaced relation with respect to the pole pieces and rotatably supported within said core, a shading ring disposed intermediate each pair of casing sections for delaying the flux passing through the pole pieces of the field casing section which is furthest from said magnetizing coil, the dimensions of each shading ring being such that its mean diameter divided by its width times its thickness is approximately 430, and the number of pairs of poles being ¼ of the total number of pole pieces present and slightly less than $$\frac{\pi D}{8C}$$

where D is the diameter of the motor and C is the gauge thickness of the discs.

8. A self-starting single phase hysteresis motor comprising a magnetizing coil, a core within said coil, a pair of field casing sections of silicon steel at each end of said coil, each of said sections comprising a disc having integral projections constituting pole pieces bent in one direction at right angles to the disc, the pole pieces of all of said sections extending in the same direction and terminating in a common plane to one side of said magnetizing coil, said pole pieces being arranged so that the pole pieces of one pair of sections are adjacent and between the pole pieces of the other pair of sections, a rotor of high retentivity having spaced relation with respect to the pole pieces and rotatably supported within said core, and shading means for delaying the flux passing through the pole pieces of one section of each pair of sections, the number of pairs of poles being ¼ of the total number of pole pieces present, and slightly less than $$\frac{\pi D}{8C}$$

where D is the diameter of the motor and C is the gauge thickness of the discs.

F. SCOTT CARPENTER.